(12) United States Patent
Okabe

(10) Patent No.: US 10,040,530 B2
(45) Date of Patent: Aug. 7, 2018

(54) OUTBOARD MOTOR

(71) Applicant: YAMAHA HATSUDOKI KABUSHIKI KAISHA, Iwata-shi, Shizuoka (JP)

(72) Inventor: Yoshihiko Okabe, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/815,900

(22) Filed: Nov. 17, 2017

(65) Prior Publication Data

US 2018/0162509 A1    Jun. 14, 2018

(30) Foreign Application Priority Data

Dec. 9, 2016 (JP) ................................. 2016-239785

(51) Int. Cl.
| | |
|---|---|
| *B63H 20/14* | (2006.01) |
| *B63H 20/18* | (2006.01) |
| *B63H 20/20* | (2006.01) |
| *F16H 57/022* | (2012.01) |
| *B63H 23/30* | (2006.01) |
| *B63H 3/00* | (2006.01) |

(52) U.S. Cl.
CPC ............. *B63H 20/18* (2013.01); *B63H 3/008* (2013.01); *B63H 20/20* (2013.01); *B63H 23/30* (2013.01); *F16H 57/022* (2013.01); *B63H 2020/145* (2013.01)

(58) Field of Classification Search
CPC ................................ B63H 20/18; B63H 20/20
See application file for complete search history.

(56) References Cited

U.S. PATENT DOCUMENTS

2012/0231683 A1* 9/2012 Kawaguchi ............ B63H 20/20
440/75

FOREIGN PATENT DOCUMENTS

| JP | 01-026924 Y2 | 8/1989 |
| JP | 11-263294 A | 9/1999 |

\* cited by examiner

*Primary Examiner* — Stephen P Avila
(74) *Attorney, Agent, or Firm* — Keating and Bennett, LLP

(57) ABSTRACT

An outboard motor includes a driving gear that is driven and rotated, and a propeller shaft that extends in a front-rear direction below the driving gear. The outboard motor includes a first transmission gear that is engaged with the driving gear and surrounding the propeller shaft, a propeller-shaft bearing that rotatably supports the propeller shaft, a first-transmission-gear bearing that rotatably supports the first transmission gear, and a support including an intervening portion between the first transmission gear and the propeller shaft. The support supports the propeller-shaft bearing between the intervening portion and the propeller shaft, and supports the first-transmission-gear bearing at a more outward position than the intervening portion in a radial direction of the propeller shaft.

9 Claims, 6 Drawing Sheets

OUTBOARD MOTOR

CROSS REFERENCE TO RELATED APPLICATIONS

This application claims the benefit of priority to Japanese Patent Application No. 2016-239785 filed on Dec. 9, 2016. The entire contents of this application are hereby incorporated herein by reference.

BACKGROUND OF THE INVENTION

1. Field of the Invention

The present invention relates to an outboard motor.

2. Description of the Related Art

A normal-rotation type outboard motor and a reverse-rotation type outboard motor are known. A propeller of a normal rotation type that generates a forward thrust by rotating in a normal rotation direction is attached to the normal-rotation type outboard motor. A propeller of a reverse rotation type that generates a forward thrust by rotating in a reverse rotation direction opposite to the normal rotation direction is attached to the reverse-rotation type outboard motor.

A reverse-rotation type outboard motor disclosed in Japanese Patent Application Publication No. 11-263294 includes a casing, an engine disposed at an upper part of the inside of the casing, a propeller shaft that extends in a front-rear direction in a lower part of the inside of the casing, and a propeller attached to a rear part of the propeller shaft. The propeller shaft is connected to a driving shaft of the engine through a gear mechanism. The gear mechanism includes a forward gear for a forward movement and a backward gear for a backward movement that surround the propeller shaft. The forward gear is disposed behind a pinion in a lower end of the driving shaft, and is engaged with the pinion. The backward gear is disposed in front of the pinion, and is engaged with the pinion. The forward gear and the backward gear rotate in mutually opposite directions when the driving shaft rotates in accordance with the driving of the engine.

A clutch body is spline-coupled to an outer surface of the propeller shaft. The clutch body is capable of selectively engaging the forward gear and the backward gear by moving in an axial direction of the propeller shaft. When the clutch body engages the forward gear, the propeller is rotated by transmitting the rotation of the forward gear to the propeller shaft through the clutch body, and a forward thrust is generated. When the clutch body engages the backward gear, the propeller is reversely rotated by transmitting the rotation of the backward gear to the propeller shaft through the clutch body, and a backward thrust is generated.

In the outboard motor disclosed in Japanese Patent Application Publication No. 11-263294, a bearing is interposed between the propeller shaft and the backward gear, and supports both the propeller shaft and the backward gear so that it can mutually relatively rotate the propeller shaft and the backward gear. While a vessel is forwardly traveling, the propeller shaft and the forward gear rotate together with each other, whereas the propeller shaft and the backward gear rotate in mutually opposite directions. As a result, the bearing between the propeller shaft and the backward gear must operate at a high speed in accordance with a difference in rotation speed between the propeller shaft and the backward gear. More specifically, a rolling element of the bearing must roll at a high speed corresponding to the sum of the number of revolutions of the propeller shaft and the number of revolutions of the backward gear. Therefore, a large burden is imposed on the bearing, and therefore the bearing is required to have high durability.

On the other hand, a normal-rotation type outboard motor differing from the outboard motor disclosed in Japanese Patent Application Publication No. 11-263294 is supposed to have an arrangement in which a forward gear is located at a more forward position than a backward gear, and a bearing is interposed between the forward gear and a propeller shaft. While the vessel is backwardly traveling, the bearing must operate at a high speed in accordance with a difference in rotation speed between the propeller shaft and the forward gear that rotate in mutually opposite directions, and therefore, also in the normal-rotation type outboard motor, durability of the bearing must be considered.

SUMMARY OF THE INVENTION

In order to overcome the previously unrecognized and unsolved challenges described above, preferred embodiments of the present invention provide outboard motors that include an engine, a driving shaft, a driving gear, a propeller shaft, a first transmission gear, a second transmission gear, a clutch body, a lower case, a propeller-shaft bearing, a first-transmission-gear bearing, and a support. The driving shaft extends downwardly from the engine, and is driven and rotated by the engine. The driving gear is attached to a lower end of the driving shaft, and rotates together with the driving shaft. The propeller shaft extends in a front-rear direction below the driving gear, and includes a rear end to which a propeller is attached. The first transmission gear engages the driving gear at a location more forward than the driving gear along the propeller shaft, and rotates around the propeller shaft in response to rotation of the driving gear. The second transmission gear engages the driving gear at a location more rearward than the driving gear along the propeller shaft, and rotates around the propeller shaft in a direction opposite to a direction of the first transmission gear in response to rotation of the driving gear. The clutch body is rotatable together with the propeller shaft and is relatively movable in the front-rear direction with respect to the propeller shaft, and transmits rotation of the first transmission gear or rotation of the second transmission gear to the propeller shaft by being selectively connected to the first transmission gear and to the second transmission gear. The lower case accommodates the driving gear, the propeller shaft, the first transmission gear, the second transmission gear, and the clutch body. The propeller-shaft bearing rotatably supports the propeller shaft. The first-transmission-gear bearing rotatably supports the first transmission gear. The support includes an intervening portion interposed between the first transmission gear and the propeller shaft, and is fixed to an inside of the lower case. The support supports the propeller-shaft bearing between the intervening portion and the propeller shaft, and supports the first-transmission-gear bearing at a more outward position than the intervening portion in a radial direction of the propeller shaft.

According to a preferred embodiment of the present invention, the propeller-shaft bearing rotatably supports the propeller shaft, and the first-transmission-gear bearing rotatably supports the first transmission gear. The propeller-shaft bearing is supported by the support between the intervening portion of the support fixed to the inside of the lower case and the propeller shaft, and the first-transmission-gear bearing is supported by the support at a more outward position than the intervening portion in the radial direction. In other words, the propeller shaft and the first transmission gear that are able to relatively rotate with respect to the propeller shaft are supported not by a shared bearing but by mutually different bearings, i.e., by the propeller-shaft bearing and the first-transmission-gear bearing which are supported by the support in the lower case. Therefore, the propeller-shaft bearing and the first-transmission-gear bearing operate in accordance with each rotation speed of the propeller shaft and the first transmission gear. Therefore, these bearings do not have to meet high endurance specifications that correspond to high-speed operations due to a difference in rotation speed when the propeller shaft and the first transmission gear rotate in mutually opposite directions. In other words, it is possible to reduce a burden imposed on each of the propeller-shaft bearing and the first-transmission-gear bearing, and therefore it is possible to improve the endurance of these bearings.

In a preferred embodiment of the present invention, the support preferably includes an outer portion located at a more outward position in the radial direction than the intervening portion and a connecting portion located between a front end of the intervening portion and a front end of the outer portion. In this case, the first transmission gear preferably includes a cylindrical portion that extends into a space between the intervening portion and the outer portion from the rear.

According to this preferred embodiment, the front end of the intervening portion and the front end of the outer portion are reinforced by the connecting portion of the support, and therefore the support is able to support the propeller-shaft bearing and the first-transmission-gear bearing in a stable state. This makes it possible for the propeller-shaft bearing to rotatably support the propeller shaft in a stable state, and makes it possible for the first-transmission-gear bearing to rotatably support the first transmission gear in a stable state. Therefore, it is possible to improve the durability of these bearings. Additionally, the cylindrical portion of the first transmission gear extends into a space between the intervening portion and the outer portion from the rear, and, as a result, it is possible to limit the first transmission gear and the support in the front-rear direction to a small area in the lower case, and hence is possible to make the lower case smaller in size.

In a preferred embodiment of the present invention, the connecting portion is preferably thicker than at least either one of the intervening portion and the outer portion.

According to this preferred embodiment, when the propeller shaft rotates so that the propeller generates a thrust, a bending load is concentrated on the connecting portion of the support, and yet the connecting portion is thick and is able to withstand the bending load. This makes it possible for the support in which the strength in the connecting portion has been increased to support the propeller-shaft bearing and the first-transmission-gear bearing in a stable state. Therefore, the propeller-shaft bearing rotatably supports the propeller shaft in a stable state, and the first-transmission-gear bearing rotatably supports the first transmission gear in a stable state. Therefore, it is possible to improve the durability of these bearings.

In a preferred embodiment of the present invention, the first-transmission-gear bearing is preferably disposed between the cylindrical portion and the intervening portion.

According to this preferred embodiment, the first-transmission-gear bearing is positioned in the radial direction by being sandwiched between the cylindrical portion and the intervening portion, and therefore it is possible for the first-transmission-gear bearing to rotatably support the first transmission gear in a state in which the position of the first-transmission-gear bearing is stable. This makes it possible to improve the durability of the first-transmission-gear bearing.

In a preferred embodiment of the present invention, the first-transmission-gear bearing is preferably disposed between the cylindrical portion and the outer portion.

According to this preferred embodiment, the first-transmission-gear bearing is positioned in the radial direction by being sandwiched between the cylindrical portion and the outer portion, and therefore it is possible for the first-transmission-gear to rotatably support the first transmission gear in a state in which the position of the first-transmission-gear is stable. This makes it possible to improve the durability of the first-transmission-gear bearing.

In a preferred embodiment of the present invention, the propeller-shaft bearing and the first-transmission-gear bearing are preferably disposed at positions, respectively, that coincide with each other when viewed from the radial direction.

According to this preferred embodiment, it is possible to limit the propeller-shaft bearing and the first-transmission-gear bearing in the front-rear direction to a small area in the lower case, and hence is possible to make the lower case smaller in size.

In a preferred embodiment of the present invention, the propeller-shaft bearing and the first-transmission-gear bearing are each preferably needle bearings. In this case, an axis of each needle in the propeller-shaft bearing and an axis of each needle in the first-transmission-gear bearing preferably extend parallel or substantially parallel to each other.

According to this preferred embodiment, each needle in the propeller-shaft bearing and each needle in the first-transmission-gear bearing are not required to roll at a high speed due to a difference in rotation speed when the propeller shaft and the first transmission gear rotate in mutually opposite directions, and therefore it is possible to improve the endurance of these bearings. Additionally, the axes of the needles in the bearings extend parallel or substantially parallel to each other, and therefore it is possible to prevent these bearings from becoming enlarged or bulky in the radial direction in the lower case. This makes it possible to make the lower case smaller in size in the radial direction.

In a preferred embodiment of the present invention, lubricating oil is preferably contained in the lower case, and a passage for the lubricating oil is preferably provided in the support so as to pass through the support.

According to this preferred embodiment, even if the support is disposed in the lower case, the smooth flow of lubricating oil in the lower case is secured by the passage in the support, and therefore it is possible to securely lubricate the friction surfaces of each member in the lower case using the lubricating oil.

In a preferred embodiment of the present invention, the propeller preferably generates a backward thrust when the clutch body is connected to the first transmission gear to transmit rotation of the first transmission gear to the propeller shaft. In this case, the propeller generates a forward thrust when the clutch body is connected to the second transmission gear to transmit rotation of the second transmission gear to the propeller shaft.

According to this preferred embodiment, while the propeller is generating a forward thrust in the reverse-rotation type outboard motor, the propeller shaft rotates together with the second transmission gear whereas the propeller shaft and the first transmission gear rotate in mutually opposite directions. However, the propeller-shaft bearing and the first-transmission-gear bearing, which are not a shared bearing for the propeller shaft and the first transmission gear, are not required to operate at a high speed due to a difference in rotation speed when the propeller shaft and the first transmission gear rotate in mutually opposite directions. Therefore, it is possible to reduce a burden imposed on each of the propeller-shaft bearing and the first-transmission-gear bearing, and therefore it is possible to improve the endurance of these bearings.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
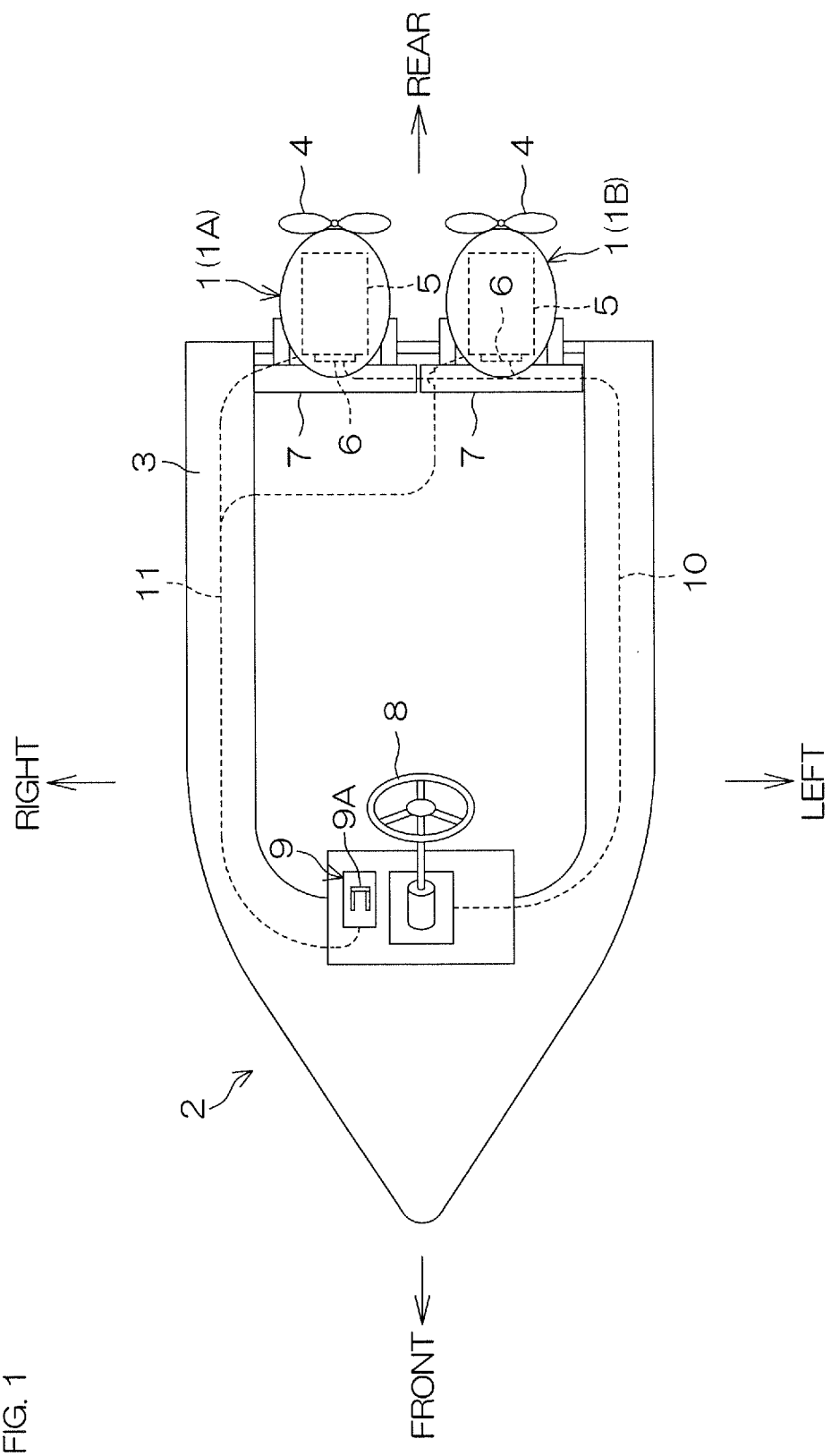
FIG. 1 is a schematic plan view to describe a vessel that includes an outboard motor according to a preferred embodiment of the present invention.

Preferred embodiments of the present invention will be hereinafter described in detail with reference to the accompanying drawings. FIG. 1 is a schematic plan view to describe a vessel 2 that includes an outboard motor 1 according to a preferred embodiment of the present invention. The vessel 2 additionally includes a hull 3. Two outboard motors 1 are attached to a rear portion of the hull 3 on right and left sides of the hull 3, respectively. Each outboard motor 1 generates a thrust that propels the hull 3 due to rotation of a propeller 4. For example, in the two outboard motors 1, the outboard motor 1 on the right side is a normal-rotation type outboard motor 1A, and the outboard motor 1 on the left side is a reverse-rotation type outboard motor 1B. The normal rotation type and the reverse rotation type have opposite torsional directions of the blades of the propellers 4. When the vessel 2 that is forwardly traveling is viewed from behind, the propeller 4 normally rotates clockwise in the normal-rotation type outboard motor 1A, whereas the propeller 4 reversely rotates counterclockwise in the reverse-rotation type outboard motor 1B.

Each outboard motor 1 includes an engine 5 that rotates the propeller 4 and an ECU (electronic control unit) 6 that controls the outboard motor 1. With respect to the outboard motor 1, a steering device 7 is provided to steer each outboard motor 1 in a left-right direction. The hull 3 includes a steering wheel 8 and a remote controller 9.

The steering wheel 8 is connected to the ECU 6 of each outboard motor 1 through a harness 10. When the steering wheel 8 is operated by a vessel operator, the ECU 6 controls the steering device 7. Accordingly, the steering device 7 steers each outboard motor 1 in the left-right direction, and therefore the vessel 2 is steered by changing the direction of a thrust provided to the hull 3 in the left-right direction.

The remote controller 9 is preferably mechanically joined to each outboard motor 1 by an operation cable 11. When the vessel operator operates an operation lever 9A provided at the remote controller 9, its operating force is transmitted to each outboard motor 1 by the operation cable 11. As a result, the shift position of each outboard motor 1 changes. In other words, the operation of the operation lever 9A enables the direction of a thrust of each outboard motor 1 to switch between the forward direction and the backward direction, and enables each outboard motor 1 to reach a neutral state in which the power of the engine 5 is not transmitted to the propeller 4. Additionally, the operating force of the operation lever 9A is transmitted to a throttle valve (not shown) of the engine 5 of each outboard motor 1. As a result, the throttle opening degree of the throttle valve is changed by the operation of the operation lever 9A, and the output of the engine 5 in each outboard motor 1 varies.

Figure 2:
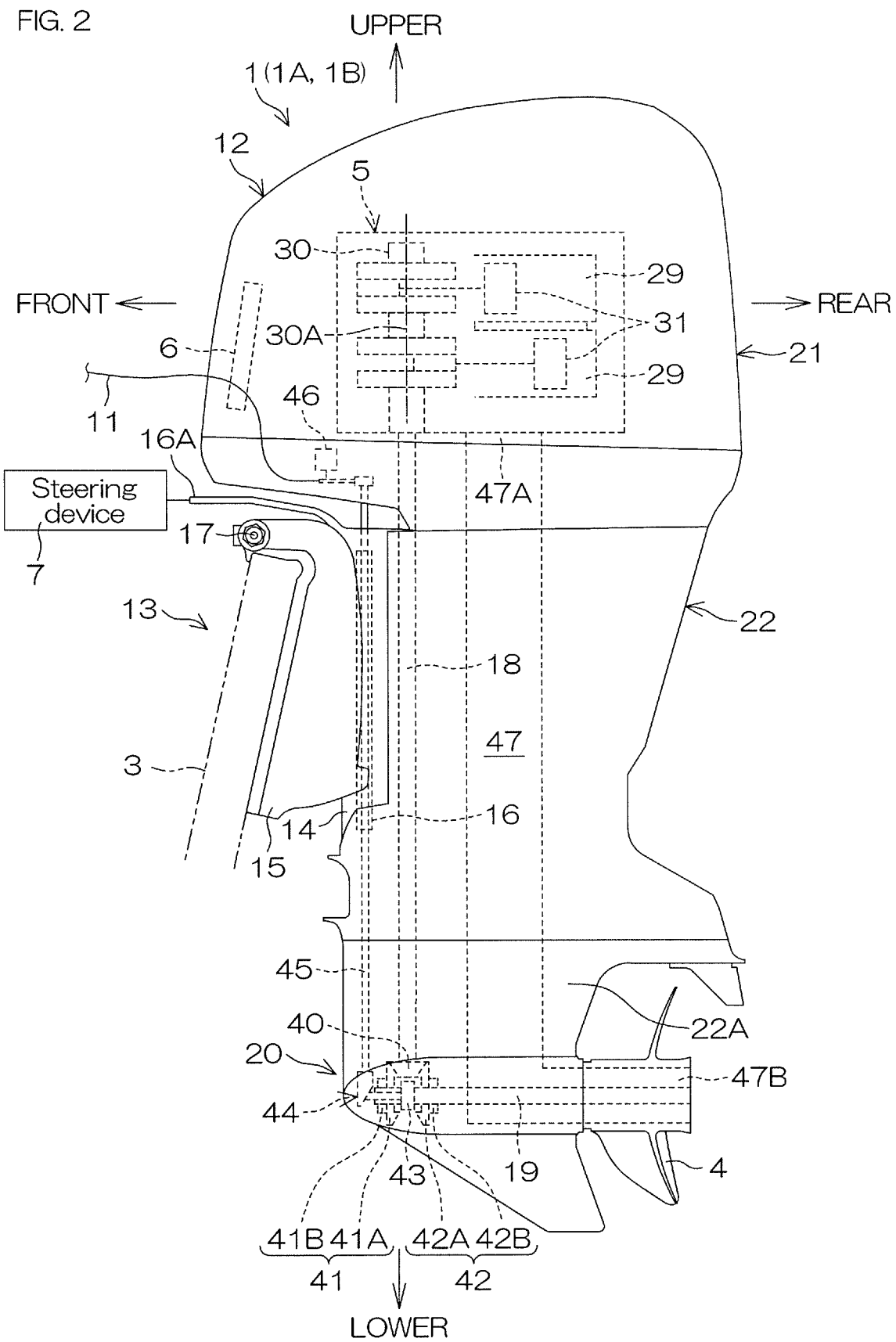
FIG. 2 is a schematic side view of the outboard motor.

FIG. 2 is a schematic left side view of the outboard motor 1. The left side in FIG. 2 is a front side of the outboard motor 1, and the right side in FIG. 2 is a rear side of the outboard motor 1. The near side in a direction perpendicular to the sheet plane of FIG. 2 is a left side of the outboard motor 1, and the far side in the direction perpendicular to the sheet plane of FIG. 2 is a right side of the outboard motor 1.

Each outboard motor 1 includes an outboard motor body 12 and a mounting mechanism 13. The mounting mechanism 13 includes a swivel bracket 14, a clamp bracket 15, a steering shaft 16, and a tilt shaft 17. The steering shaft 16 extends in an up-down direction. The tilt shaft 17 is horizontally disposed so as to extend in the left-right direction. The swivel bracket 14 is connected to the outboard motor body 12 through the steering shaft 16. The clamp bracket 15 is connected to the swivel bracket 14 through the tilt shaft 17. The clamp bracket 15 is fixed to the rear portion of the hull 3. Accordingly, the outboard motor body 12 is attached to the rear portion of the hull 3 by the mounting mechanism 13 in a perpendicular or substantially perpendicular attitude.

The outboard motor body 12 and the swivel bracket 14 are turnable in the up-down direction around the tilt shaft 17 with respect to the clamp bracket 15. The outboard motor body 12 is tilted with respect to the hull 3 and the clamp bracket 15 by allowing the outboard motor body 12 to be turned around the tilt shaft 17. The outboard motor body 12 is turnable together with the steering shaft 16 in the left-right direction with respect to the swivel bracket 14 and the clamp bracket 15. When the vessel operator operates the steering wheel 8, a steering signal is transmitted to the ECU 6. Based on the steering signal, the ECU 6 controls the steering device 7. The driving force of the steering device 7 is transmitted to the steering shaft 16 through a lever 16A. As a result, the outboard motor body 12 turns together with the steering shaft 16 in the left-right direction, and therefore the vessel 2 is steered.

The outboard motor body 12 includes a driving shaft 18, a propeller shaft 19, and a forward-backward switching mechanism 20. The outboard motor body 12 includes a box-shaped engine cover 21 and a hollow casing 22 that extends downwardly from the engine cover 21. The engine cover 21 and the casing 22 are each made of, for example, aluminum. A lower end of the casing 22 is a lower case 22A. The engine 5 is contained in the engine cover 21. The driving shaft 18 is disposed in the engine cover 21 and in the casing 22, and extends downwardly from the engine 5. The propeller shaft 19 extends in the front-rear direction in the lower case 22A. A lower end of the driving shaft 18 is connected to a front end of the propeller shaft 19 by the forward-backward switching mechanism 20. A rear end of the propeller shaft 19 protrudes rearwardly from the lower case 22A. The propeller 4 is attached to the rear end of the propeller shaft 19. The propeller 4 rotates together with the propeller shaft 19.

The engine 5 is preferably an internal combustion engine, for example, that generates power by burning fuel, such as gasoline, and into which a combustion chamber 29, a crankshaft 30, and a piston 31 are built. The crankshaft 30 has a crankshaft axis 30A that extends in the up-down direction. A lower end of the crankshaft 30 is connected to an upper end of the driving shaft 18. The piston 31 is rectilinearly reciprocated in the front-rear direction perpendicular to the crankshaft axis 30A by the combustion of an air-fuel mixture in the combustion chamber 29. Accordingly, the crankshaft 30 is driven and rotated around the crankshaft axis 30A while driving and rotating the driving shaft 18. The rotational direction of the crankshaft 30 and that of the driving shaft 18 are, for example, clockwise directions, respectively, when viewed from above.

The forward-backward switching mechanism 20 includes a driving gear 40, a first transmission gear 41, a second transmission gear 42, a clutch body 43, and a shift mechanism 44, and is contained in the lower case 22A along with the propeller shaft 19. The driving gear 40, the first transmission gear 41, and the second transmission gear 42 are, for example, cylindrical bevel gears. The first transmission gear 41 includes an integral annular umbrella-shaped portion 41A and a cylindrical projection portion 41B that protrudes forwardly from an inner periphery of the umbrella-shaped portion 41A. In a rear surface of the umbrella-shaped portion 41A, a tooth 41C is provided at a taper-shaped outer periphery, and a claw 41D is provided at the inner periphery (see FIG. 3 described below). The second transmission gear 42 includes an integral annular umbrella-shaped portion 42A and a cylindrical projecting portion 42B that protrudes rearwardly from the inner periphery of the umbrella portion 42A. In a front surface of the umbrella-shaped portion 42A, a tooth 42C is provided at a taper-shaped outer periphery, and a claw 42D is provided at the inner periphery (see FIG. 3).

The driving gear 40 is attached to the lower end of the driving shaft 18. The propeller shaft 19 is disposed below the driving gear 40. The first transmission gear 41 is located more forward than the driving gear 40 at the front end of the propeller shaft 19, and the second transmission gear 42 is located more rearward than the driving gear 40 along the front end of the propeller shaft 19. The first transmission gear 41 and the second transmission gear 42 are disposed such that their teeth 41C and 42C face each other with an interval therebetween in the front-rear direction, and are engaged with the driving gear 40. When the driving gear 40 rotates together with the driving shaft 18 in response to the driving of the engine 5, the rotation of the driving gear 40 is transmitted to the first transmission gear 41 and to the second transmission gear 42. As a result, the first transmission gear 41 and the second transmission gear 42 rotate in mutually opposite directions around the propeller shaft 19.

The clutch body 43 is disposed between the first transmission gear 41 and the second transmission gear 42. The clutch body 43 is, for example, a cylindrical dog clutch, and surrounds the front end of the propeller shaft 19. A first claw 43A is provided on a front end surface of the clutch body 43, and a second claw 43B is provided on a rear end surface of the clutch body 43 (see FIG. 3). The clutch body 43 is connected to the front end of the propeller shaft 19 by, for example, a spline. Therefore, the clutch body 43 rotates together with the front end of the propeller shaft 19. Additionally, the clutch body 43 is movable in the front-rear direction with respect to the front end of the propeller shaft 19. As thus described, the clutch body 43 that is rotatable together therewith and that is relatively movable in the front-rear direction with respect to the propeller shaft 19 is moved in the front-rear direction along the axial direction of the propeller shaft 19 by the shift mechanism 44.

The shift mechanism 44 includes, for example, a shift rod 45 that extends in the up-down direction and a neutral switch 46. The shift rod 45 is joined to the operation cable 11, and is turned around the axis of the shift rod 45 by an operating force input from the operation cable 11. The clutch body 43 is moved in the front-rear direction by allowing the shift rod 45 to be turned. The clutch body 43 is located at any one of a neutral position, a forward position, and a backward position. The neutral switch 46 detects whether the position of the clutch body 43 is the neutral position. A detection value of the neutral switch 46 is input to the ECU 6.

The neutral position is a position at which the clutch body 43 is engaged neither with the first transmission gear 41 nor with the second transmission gear 42, and is a position between the forward position and the backward position. In a state in which the clutch body 43 is located at the neutral position, the rotation of the driving shaft 18 is not transmitted to the propeller shaft 19, and therefore the shift position of the outboard motor 1 is "neutral."

Figure 3:
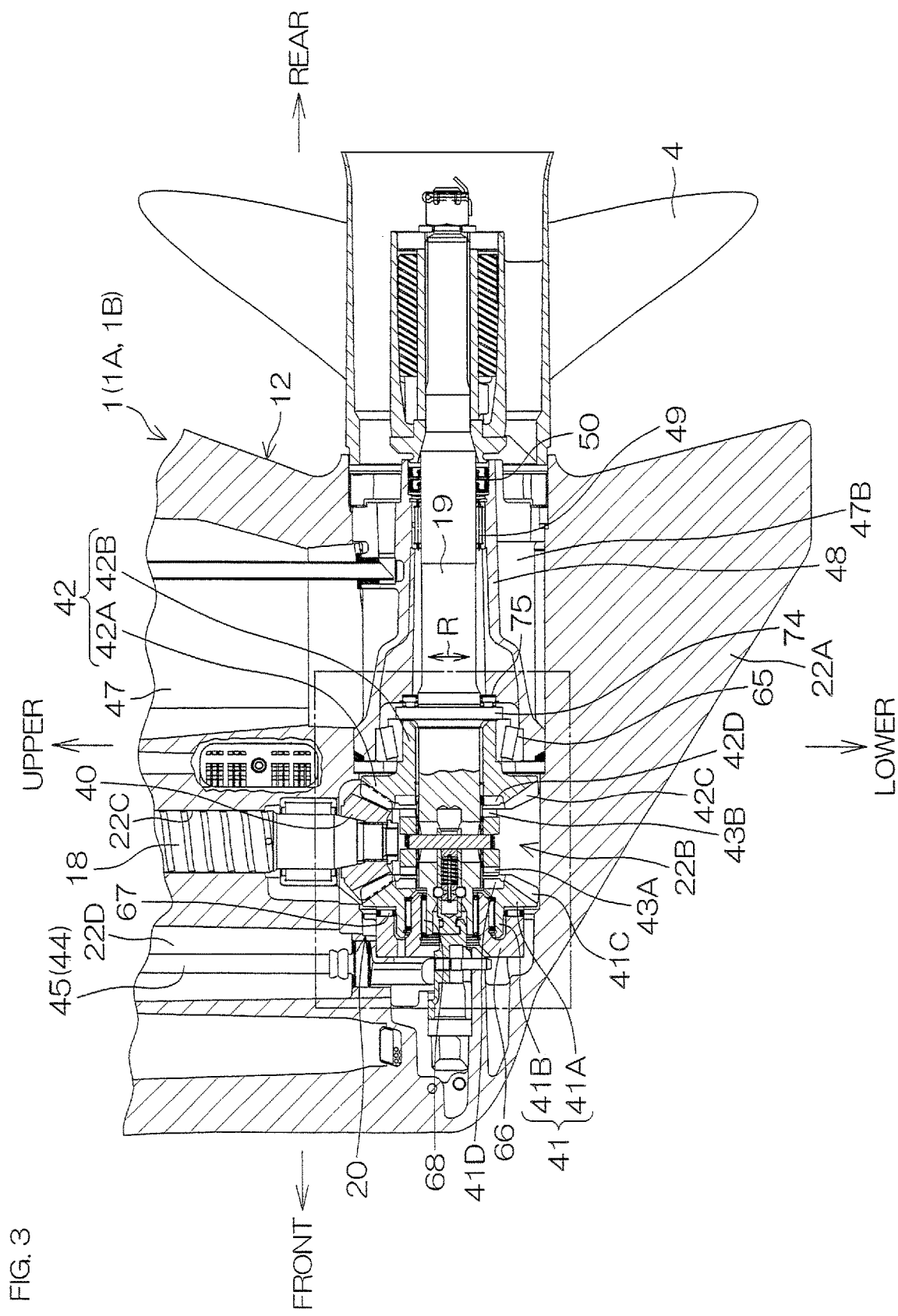
FIG. 3 is a longitudinal sectional view of a lower portion of an outboard motor according to a first preferred embodiment of the present invention.

In the normal-rotation type outboard motor 1A, the forward position is a position at which the first claw 43A of the clutch body 43 engages the claw 41D of the first transmission gear 41, and the backward position is a position at which the second claw 43B of the clutch body 43 engages the claw 42D of the second transmission gear 42 (see FIG. 3). In a state in which the clutch body 43 is located at the forward position and is connected to the first transmission gear 41, the rotation of the first transmission gear 41 is transmitted to the propeller shaft 19, and therefore the shift position of the outboard motor 1 is "forward." When the rotation of the first transmission gear 41 is transmitted to the propeller shaft 19, the propeller 4 rotates in a forward rotational direction (clockwise when viewed from behind). As a result, a forward thrust (in the forward direction) is generated. In a state in which the clutch body 43 is located at the backward position and is connected to the second transmission gear 42, the rotation of the second transmission gear 42 is transmitted to the propeller shaft 19, and therefore the shift position of the outboard motor 1 is "backward." When the rotation of the second transmission gear 42 is transmitted to the propeller shaft 19, the propeller 4 rotates in a reverse rotational direction opposite to the forward rotational direction. As a result, a backward thrust (in the backward direction) is generated. As thus described, in the normal-rotation type outboard motor 1A, the first transmission gear 41 is a forward gear for a forward movement, and the second transmission gear 42 is a backward gear for a backward movement.

In the reverse-rotation type outboard motor 1B, the forward position is a position at which the second claw 43B of the clutch body 43 engages the claw 42D of the second transmission gear 42, and the backward position is a position at which the first claw 43A of the clutch body 43 engages the claw 41D of the first transmission gear 41 (see FIG. 3). In a state in which the clutch body 43 is located at the forward position and is connected to the second transmission gear 42, the rotation of the second transmission gear 42 is transmitted to the propeller shaft 19, and therefore the shift position of the outboard motor 1 is "forward." When the rotation of the second transmission gear 42 is transmitted to the propeller shaft 19, the propeller 4 rotates in a forward rotational direction (counterclockwise when viewed from behind). As a result, a forward thrust is generated. In a state in which the clutch body 43 is located at the backward position and is connected to the first transmission gear 41, the rotation of the first transmission gear 41 is transmitted to the propeller shaft 19, and therefore the shift position of the outboard motor 1 is "backward." When the rotation of the first transmission gear 41 is transmitted to the propeller shaft 19, the propeller 4 rotates in a reverse rotational direction opposite to the forward rotational direction. As a result, a backward thrust is generated. As thus described, in the reverse-rotation type outboard motor 1B, the first transmission gear 41 is a backward gear for a backward movement, and the second transmission gear 42 is a forward gear for a forward movement.

As described above, in each outboard motor 1, the clutch body 43 is selectively connected to the first transmission gear 41 and to the second transmission gear 42 in response to switching between its positions, and hence transmits the rotation of the first transmission gear 41 or the second transmission gear 42 to the propeller shaft 19. As a result, switching between the rotational directions of the propeller 4 is performed. The rotational direction of the propeller 4 is changed by the operation of the operation lever 9A of the remote controller 9 (see FIG. 1).

The outboard motor body 12 includes an exhaust passage 47 provided inside the outboard motor body 12. The exhaust passage 47 includes an inlet 47A connected to the engine 5 and an outlet 47B connected to the propeller 4. When the vessel 2 is floating on water, the outlet 47B is positioned in the water. Therefore, when the vessel 2 is floating on water, water that has passed through the outlet 47B extends into a downstream portion of the exhaust passage 47. For example, when the engine 5 is rotating at a high speed, water in the exhaust passage 47 is pushed by the pressure of exhaust gases flowing from the engine 5, and is discharged from the outlet 47B together with the exhaust gases. As a result, the exhaust gases generated in the engine 5 are discharged into water.

Next, an internal structure of the lower case 22A will be described in detail. For example, first to third preferred embodiments of the outboard motor 1 are described in accordance with a difference in the internal structure of the lower case 22A. The first preferred embodiment will be hereinafter described in detail, and, with respect to the second and third preferred embodiments, elements that differ from those of the first preferred embodiment will be described. FIG. 3 is a longitudinal sectional view of a lower portion of the outboard motor 1 according to the first preferred embodiment. A disposition space 22B in which the driving gear 40, the first transmission gear 41, the second transmission gear 42, the clutch body 43, the front end of the propeller shaft 19, and a lower end of the shift rod 45 are disposed is defined in the lower case 22A. A disposition space 22C in which the driving shaft 18 is disposed and a disposition space 22D in which a portion of the shift rod 45 that is located at a more upward position than its lower end is disposed are defined in the lower case 22A. A lower end of the disposition space 22C and a lower end of the disposition space 22D are connected to the disposition space 22B from above. The disposition space 22B, the disposition space 22C, and the disposition space 22D are separated from the exhaust passage 47. Lubricating oil is contained in the disposition space 22B, the disposition space 22C, and the disposition space 22D.

A cylinder portion 48 that is disposed at the outlet 47B of the exhaust passage 47 and that extends in the front-rear direction is provided as a portion of the lower case 22A in the lower case 22A. The internal space of the cylinder portion 48 is connected to the disposition space 22B from behind. Therefore, lubricating oil in the disposition space 22B also reaches the internal space of the cylinder portion 48. The cylinder portion 48 surrounds a halfway portion between the front and rear ends of the propeller shaft 19. A bearing 49, such as a needle bearing, is disposed between the cylinder portion 48 and the halfway portion of the propeller shaft 19, and the halfway portion of the propeller shaft 19 is rotatably supported by the bearing 49. A seal 50, such as an oil seal, is disposed between a rear end of the cylinder portion 48 and the propeller shaft 19, and the internal space of the cylinder portion 48 is blocked by the seal 50 from behind. As a result, the internal space of the cylinder portion 48 is separated from the exhaust passage 47, and therefore lubricating oil in the cylinder portion 48 is prevented from leaking into the exhaust passage 47.

Figure 4:
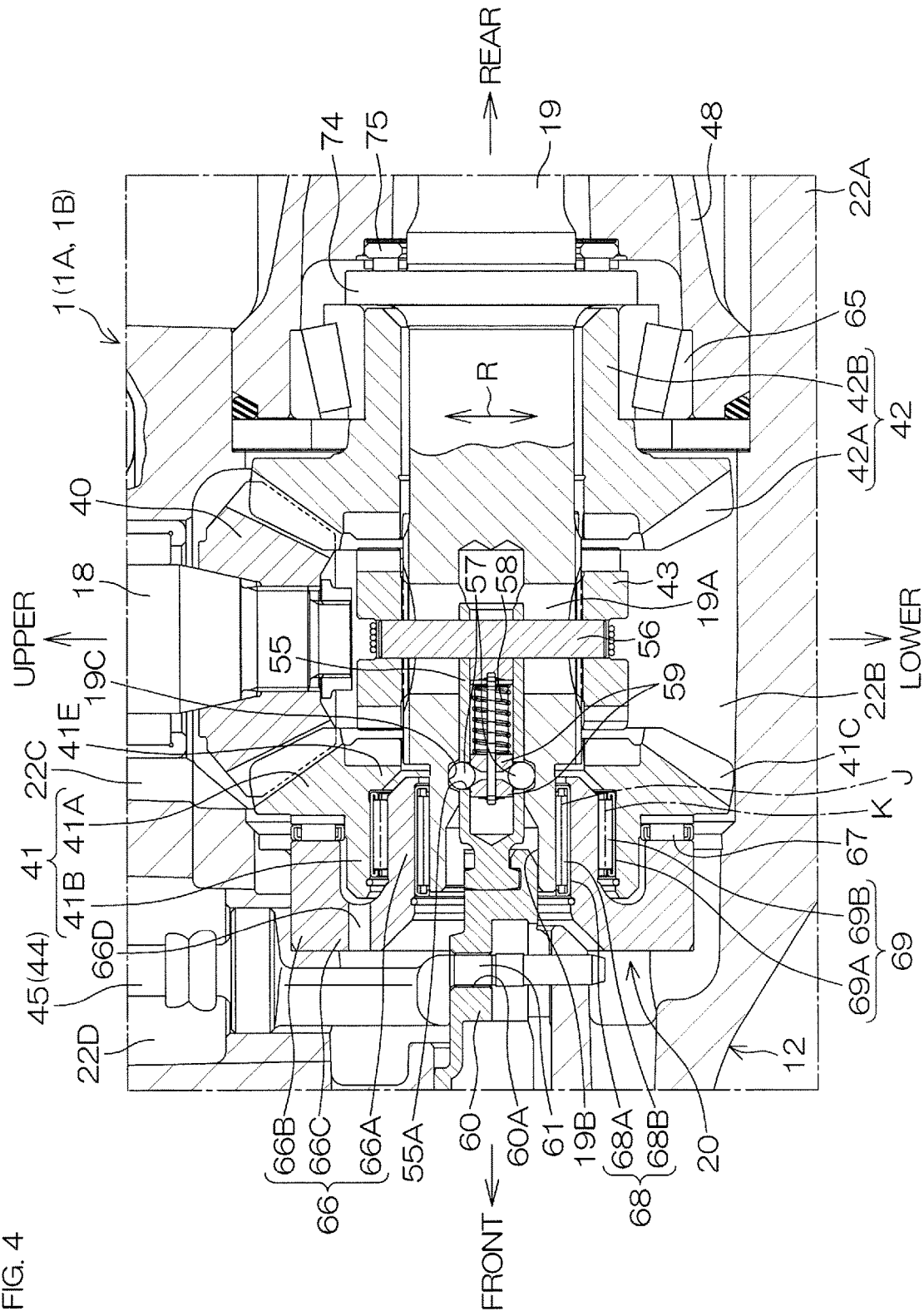
FIG. 4 is an enlarged view of a portion surrounded by the alternate long and short dashed line of FIG. 3.

FIG. 4 is an enlarged view of a portion surrounded by the alternate long and short dashed line of FIG. 3.

A through hole 19A that extends in a radial direction R centering on the propeller shaft 19 is provided in a portion surrounded by the clutch body 43 in the front end of the propeller shaft 19. A through-hole 19B that extends rearwardly from its front end surface to the through hole 19A through the center of the propeller shaft 19 is provided in the propeller shaft 19. A tubular shift sleeve 55 that extends in the front-rear direction is inserted in the through-hole 19B. The shift sleeve 55 is connected to the clutch body 43 by a connection pin 56 that passes through a rear end of the shift sleeve 55 in the radial direction R in the through hole 19A. A plurality of through holes 55A in each of which a ball 57 is fitted one by one are arranged in a circumferential direction in an outer peripheral surface of the shift sleeve 55 at a more forward position than its rear end. Each ball 57 is urged outwardly in the radial direction R by being sandwiched between a front-rear pair of sandwiching portions 59 urged by an urging member 58 so as to approach each other in the shift sleeve 55. A concave portion 19C that extends in the circumferential direction is provided on an inner peripheral surface of the propeller shaft 19 in the through-hole 19B. When the clutch body 43 is in the neutral position, each ball 57 is fitted in the concave portion 19C. As a result, the clutch body 43 is held so as not to unexpectedly deviate from the neutral position.

A cam follower 60 is connected to a front end of the shift sleeve 55 from the front. An engagement groove 60A that extends in the up-down direction is provided on the cam follower 60. A driving pin 61 that extends in the up-down direction is fixed to the lower end of the shift rod 45 at a position deviating from a rotational axis of the shift rod 45, and the driving pin 61 is inserted in the engagement groove 60A. When the shift rod 45 turns, the driving pin 61 moves in the front-rear direction while being accompanied by the cam follower 60 and while turning together with the shift rod 45. As a result, the shift sleeve 55 moves in the front-rear direction, and the connection pin 56 moves in the front-rear direction in the through hole 19A of the propeller shaft 19. Thereupon, the clutch body 43 that has been connected to the connection pin 56 moves from the neutral position to the forward position or to the backward position.

Each outboard motor 1 includes a second-transmission-gear bearing 65, a support 66, a thrust bearing 67, a propeller-shaft bearing 68, and a first-transmission-gear bearing 69. The second-transmission-gear bearing 65 is disposed between a cylindrical projecting portion 42B surrounding the propeller shaft 19 in the second transmission gear 42 and a front end of the cylinder portion 48. The second-transmission-gear bearing 65 is, for example, a conical roller bearing, and rotatably supports the second transmission gear 42, and receives a radial load and an axial load of the second transmission gear 42. The propeller shaft 19 is provided with a flange 74 that projects from its outer peripheral surface and that comes into contact with an inner ring of the second-transmission-gear bearing 65 from behind. Each outboard motor 1 additionally includes a thrust bearing 75 that comes into contact with the flange 74 from behind and that is sandwiched between the flange 74 and the cylinder portion 48. A forward thrust is transmitted to the lower case 22A through the propeller shaft 19, the flange 74, and the second-transmission-gear bearing 65. A backward thrust is transmitted to the lower case 22A through the propeller shaft 19, the flange 74, and the thrust bearing 75.

The support 66 is preferably a housing having an annular or substantially annular shape, and is adjacent to the first transmission gear 41 from the front, and is disposed coaxially with the propeller shaft 19 in the disposition space 22B in the lower case 22A. The support 66 is fixed to any one of the elements of the lower case 22A. The support 66 includes an integral intervening portion 66A, outer portion 66B, and connecting portion 66C. The intervening portion 66A preferably has a circularly cylindrical shape having a thickness direction coinciding with the radial direction R, and is interposed between the cylindrical portion 41B of the first transmission gear 41 and the propeller shaft 19. The outer portion 66B has a thickness direction coinciding with the radial direction R, and preferably has a circularly cylindrical shape that is larger in diameter than the intervening portion 66A, and is located at a more outward position in the radial direction R than the intervening portion 66A.

The connecting portion 66C preferably has an annular plate shape that has a thickness direction coinciding with the front-rear direction, and connects a front end of the intervening portion 66A and a front end of the outer portion 66B. The connecting portion 66C is thicker than at least either one of the intervening portion 66A and the outer portion 66B. For example, the connecting portion 66C is thicker than the intervening portion 66A in the first preferred embodiment of FIG. 4 and the second preferred embodiment of FIG. 5, and is thicker than the outer portion 66B in the third preferred embodiment of FIG. 6.

A passage 66D for lubricating oil is provided in the support 66 so as to pass therethrough. The passage 66D passes through, for example, the connecting portion 66C in the front-rear direction. A plurality of passages 66D may be provided. Even if the support 66 is disposed in the lower case 22A, the smooth flow of lubricating oil in the lower case 22A is secured by the passage 66D, and therefore it is possible to securely lubricate the friction surfaces of each member, such as that of the first transmission gear 41, in the lower case 22A using the lubricating oil.

The cylindrical portion 41B of the first transmission gear 41 extends into a space between the intervening portion 66A and the outer portion 66B from the rear. This makes it possible to limit the first transmission gear 41 and the support 66 in the front-rear direction to a small area in the lower case 22A, and hence makes it possible to make the lower case 22A smaller in size. The outer portion 66B faces the umbrella-shaped portion 41A of the first transmission gear 41 from the front.

The thrust bearing 67 is disposed in a gap between the outer portion 66B and the umbrella-shaped portion 41A in the front-rear direction, and rotatably supports the first transmission gear 41. The thrust bearing 67 receives a forward direction component of an engagement reaction force that the first transmission gear 41 undergoes from the driving gear 40 as an axial load.

The propeller-shaft bearing 68 and the first-transmission-gear bearing 69 are each preferably needle bearings, for example. The propeller-shaft bearing 68 includes an annular outer cylinder 68A and a plurality of needles 68B held by the outer cylinder 68A along the circumferential direction of the outer cylinder 68A. The first-transmission-gear bearing 69 includes an annular outer cylinder 69A and a plurality of needles 69B held by the outer cylinder 69A along the circumferential direction of the outer cylinder 69A. The propeller-shaft bearing 68 and the first-transmission-gear bearing 69 are disposed at positions, respectively, that coincide with each other when viewed from the radial direction R. This makes it possible to limit the propeller-shaft bearing 68 and the first-transmission-gear bearing 69 in the front-rear direction to a small area in the lower case 22A, and hence makes it possible to make the lower case 22A smaller in size.

The propeller-shaft bearing 68 is disposed between the intervening portion 66A and the propeller shaft 19, and the outer cylinder 68A is press-fitted, for example, to the inner peripheral surface of the intervening portion 66A, and each needle 68B juts out from the outer cylinder 68A and comes into contact with the outer peripheral surface of the propeller shaft 19. As a result, the propeller-shaft bearing 68 is supported by the support 66, and rotatably supports the propeller shaft 19, and receives a radial load of the propeller shaft 19. The first-transmission-gear bearing 69 is disposed at a more outward position than the intervening portion 66A in the radial direction R, and is supported by the support 66, and rotatably supports the first transmission gear 41, and receives a radial load of the first transmission gear 41.

In other words, the propeller shaft 19 and the first transmission gear 41 that relatively rotate with respect to the propeller shaft 19, are not supported by a shared bearing but by mutually different bearings, i.e., by the propeller-shaft bearing 68 and the first-transmission-gear bearing 69. As a result, in the normal-rotation type outboard motor 1A, the propeller-shaft bearing 68 and the first-transmission-gear bearing 69 are not required to operate at a high speed due to a difference in rotation speed when the propeller shaft 19 and the first transmission gear 41 rotate in mutually opposite directions during backward traveling. The fact that the propeller-shaft bearing 68 and the first-transmission-gear bearing 69 operate at a high speed denotes that each needle 68B in the propeller-shaft bearing 68 and each needle 69B in the first-transmission-gear bearing 69 roll at a high speed. It is possible to limit the rolling speed of each needle 68B, 69B to, for example, a half in comparison with a case in which the propeller shaft 19 and the first transmission gear 41 are supported by a shared bearing. In the reverse-rotation type outboard motor 1B, the propeller-shaft bearing 68 and the first-transmission-gear bearing 69 are not required to operate at a high speed due to a difference in rotation speed when the propeller shaft 19 and the first transmission gear 41 rotate in mutually opposite directions during forward traveling.

As thus described, in the outboard motor 1A and the outboard motor 1B, the propeller-shaft bearing 68 and the first-transmission-gear bearing 69 do not have to meet high endurance specifications that correspond to high-speed operations due to a difference in rotation speed when the propeller shaft 19 and the first transmission gear 41 rotate in mutually opposite directions. Therefore, these bearings are merely required to be operable in accordance with each rotation speed of the propeller shaft 19 and the first transmission gear 41. Therefore, it is possible to reduce a burden imposed on each of the propeller-shaft bearing 68 and the first-transmission-gear bearing 69, and therefore it is possible to improve the endurance of these bearings. This makes it possible to improve the quality of the outboard motor 1.

The front end of the intervening portion 66A and the front end of the outer portion 66B are reinforced by the connecting portion 66C of the support 66, and therefore the support 66 is able to support the propeller-shaft bearing 68 and the first-transmission-gear bearing 69 in a stable state. This makes it possible for the propeller-shaft bearing 68 to rotatably support the propeller shaft 19 in a stable state, and makes it possible for the first-transmission-gear bearing 69 to rotatably support the first transmission gear 41 in a stable state. Therefore, it is possible to improve the durability of these bearings.

When the propeller shaft 19 rotates so that the propeller 4 generates a thrust, a bending load is concentrated on the connecting portion 66C of the support 66, and yet the connecting portion 66C is thick and is able to withstand the bending load. This makes it possible for the support 66 in which the strength in the connecting portion 66C has been increased to support the propeller-shaft bearing 68 and the first-transmission-gear bearing 69 in a stable state. Therefore, the propeller-shaft bearing 68 rotatably supports the propeller shaft 19 in a stable state, and the first-transmission-gear bearing 69 rotatably supports the first transmission gear 41 in a stable state. Therefore, it is possible to improve the durability of these bearings.

Figure 6:
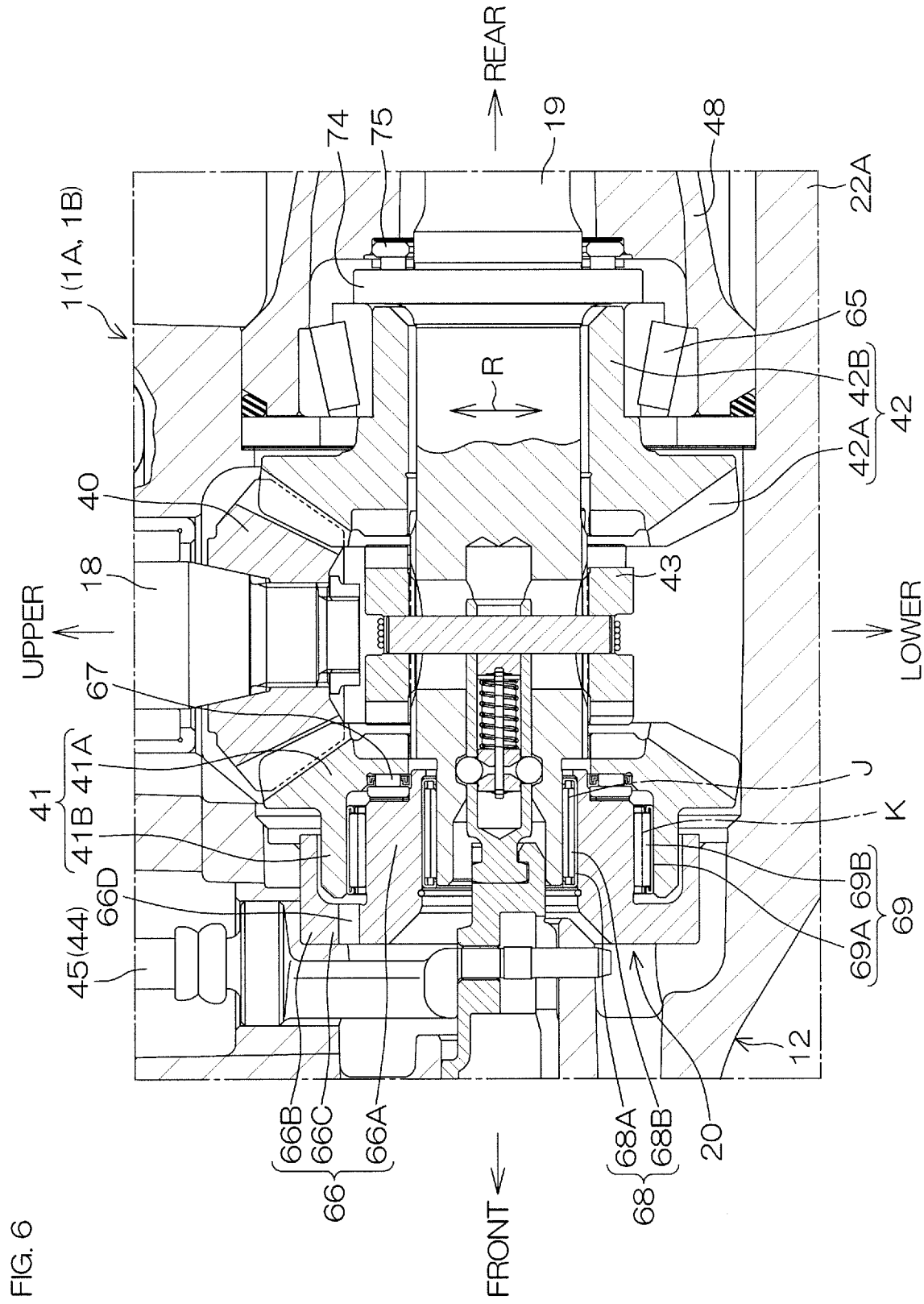
FIG. 6 is a view showing a portion corresponding to FIG. 4 in an outboard motor according to a third preferred embodiment of the present invention.

In the first preferred embodiment of FIG. 4 and the third preferred embodiment of FIG. 6, the first-transmission-gear bearing 69 is disposed between the cylindrical portion 41B of the first transmission gear 41 and the intervening portion 66A. In the first-transmission-gear bearing 69, the outer cylinder 69A is preferably press-fitted to the inner peripheral surface of the cylindrical portion 41B, and each needle 69B juts out from the outer cylinder 69A and comes into contact with the outer peripheral surface of the intervening portion 66A. In this case, the first-transmission-gear bearing 69 is positioned in the radial direction R by being sandwiched between the cylindrical portion 41B and the intervening portion 66A, and therefore it is possible for the first-transmission-gear bearing 69 to rotatably support the first transmission gear 41 in which the position of the first-transmission-gear bearing 69 is stable. This makes it possible to improve the durability of the first-transmission-gear bearing 69. In the first preferred embodiment, the first-transmission-gear bearing 69 is also positioned in the front-rear direction by a projecting portion 41E protruding to a more inward position in the radial direction R than the cylindrical portion 41B in the umbrella-shaped portion 41A of the first transmission gear 41 to come into contact with the outer cylinder 69A from behind.

Figure 5:
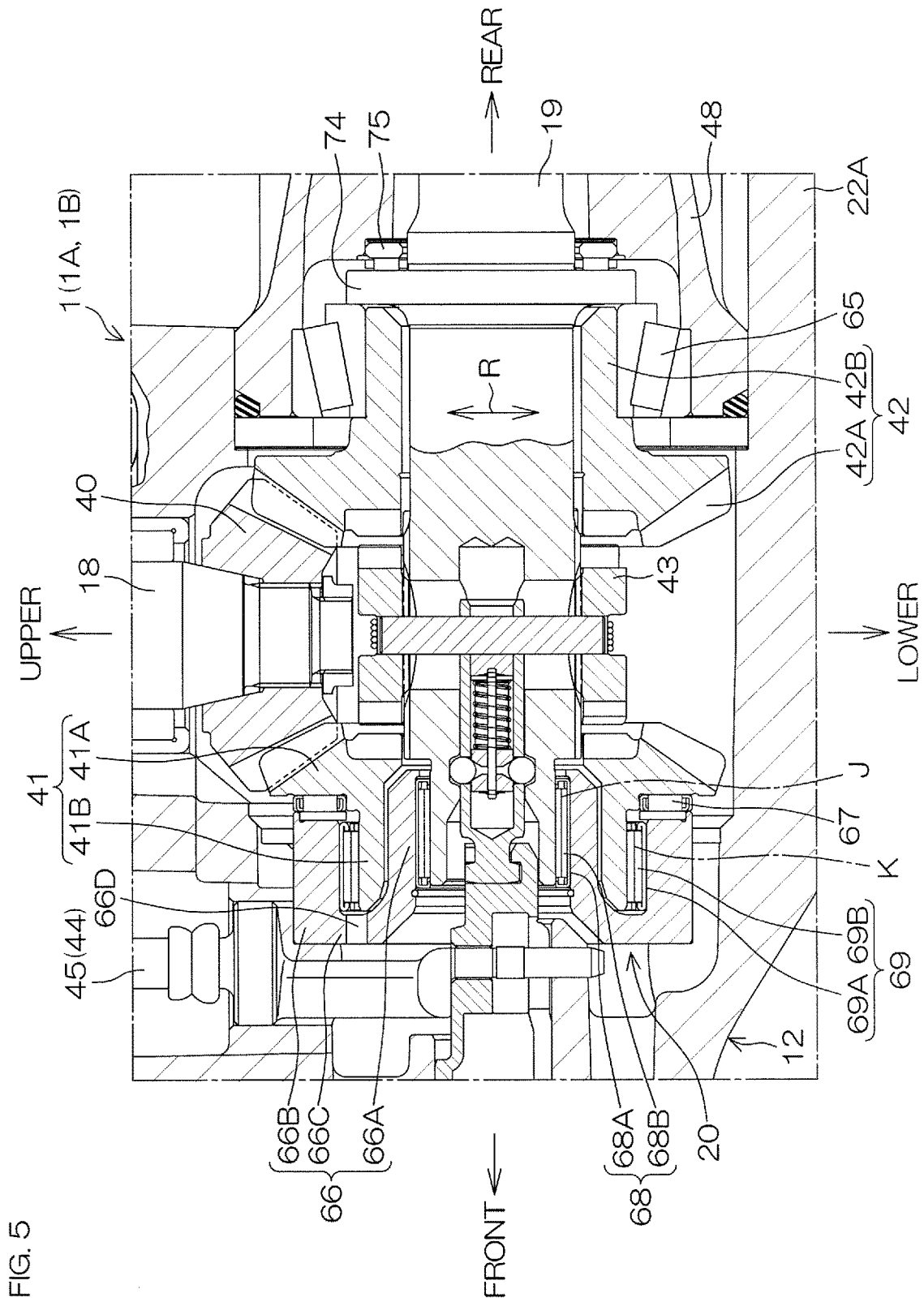
FIG. 5 is a view showing a portion corresponding to FIG. 4 in an outboard motor according to a second preferred embodiment of the present invention.

The first-transmission-gear bearing 69 may be disposed between the cylindrical portion 41B and the outer portion 66B in the same way as in the second preferred embodiment of FIG. 5. In the first-transmission-gear bearing 69, the outer cylinder 69A is preferably press-fitted to the inner peripheral surface of the outer portion 66B, and each needle 69B juts out from the outer cylinder 69A and comes into contact with the outer peripheral surface of the cylindrical portion 41B. In this case, the first-transmission-gear bearing 69 is positioned in the radial direction R by being sandwiched between the cylindrical portion 41B and the outer portion 66B, and therefore it is possible for the first-transmission-gear bearing 69 to rotatably support the first transmission gear 41 in which the position of the first-transmission-gear bearing 69 is stable. This makes it possible to improve the durability of the first-transmission-gear bearing 69.

An axis J of each needle 68B in the propeller-shaft bearing 68 and an axis K of each needle 69B in the first-transmission-gear bearing 69 extend parallel or substantially parallel to each other. Therefore, it is possible to prevent these bearings from becoming enlarged in the radial direction R in the lower case 22A. This makes it possible to make the lower case 22A smaller in size in the radial direction R.

As described above, the support 66 supports the thrust bearing 67, the propeller-shaft bearing 68, and the first-transmission-gear bearing 69 in a mutually independent manner. In this case, it is possible to support a radial load of the propeller shaft 19 and an axial load and a radial load of the first transmission gear 41 in a mutually independent manner by the support 66. This makes it possible to significantly reduce or prevent these loads from affecting each other or from affecting the operation of the shift mechanism 44. Additionally, the propeller-shaft bearing 68 and the first-transmission-gear bearing 69, both of which have been improved in endurance and the durability as described above, are able to be reduced in size, and therefore it is possible to dispose these bearings compactly in the lower case 22A. This makes it possible to make the lower case 22A smaller in size.

Other Preferred Embodiments

Although the first to third preferred embodiments of the present invention have been described above, the present invention is not restricted to the contents of these preferred embodiments and various modifications are possible within the scope of the present invention.

For example, the thrust bearing 67 may be disposed in a gap between the intervening portion 66A and the inner periphery of the umbrella-shaped portion 41A of the first transmission gear 41 in the front-rear direction in the same way as in the third preferred embodiment of FIG. 6.

Although the vessel 2 in the present preferred embodiment preferably includes two outboard motors 1 (see FIG. 1), the number of outboard motors 1 can be arbitrarily changed, and only one normal-rotation type or reverse-rotation type outboard motor 1 may be included.

In the normal-rotation type outboard motor 1A and the reverse-rotation type outboard motor 1B, a difference in the detailed structure therebetween is permissible.

In the normal-rotation type outboard motor 1A, the frequency with which the first transmission gear 41 and the propeller shaft 19 rotate in mutually opposite directions is lower than in the reverse-rotation type outboard motor 1B, and therefore the support 66 may be excluded, and the first transmission gear 41 and the propeller shaft 19 may be rotatably supported by a shared bearing.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
an engine;
a driving shaft extending downwardly from the engine and that is driven and rotated by the engine;
a driving gear attached to a lower end of the driving shaft and that rotates together with the driving shaft;
a propeller shaft extending in a front-rear direction below the driving gear and that includes a rear end to which a propeller is attached;
a first transmission gear that engages the driving gear at a location more forward than the driving gear along the propeller shaft and that rotates around the propeller shaft in response to rotation of the driving gear;
a second transmission gear that engages the driving gear in at a location more rearward than the driving gear along the propeller shaft and that rotates around the propeller shaft in a direction opposite to a direction of the first transmission gear in response to rotation of the driving gear;
a clutch body that is rotatable together with the propeller shaft and that is relatively movable in the front-rear direction with respect to the propeller shaft, the clutch body transmitting rotation of the first transmission gear or rotation of the second transmission gear to the propeller shaft by being selectively connected to the first transmission gear and to the second transmission gear;
a lower case that accommodates the driving gear, the propeller shaft, the first transmission gear, the second transmission gear, and the clutch body;
a propeller-shaft bearing that rotatably supports the propeller shaft;
a first-transmission-gear bearing that rotatably supports the first transmission gear; and
a support; wherein
the support includes an intervening portion interposed between the first transmission gear and the propeller shaft;
the support is fixed to an inside of the lower case;
the support supports the propeller-shaft bearing between the intervening portion and the propeller shaft; and
the support supports the first-transmission-gear bearing at a more outward position than the intervening portion in a radial direction of the propeller shaft.

2. The outboard motor according to claim 1, wherein the support includes an outer portion located at a more outward position in the radial direction than the intervening portion and a connection portion that connects a front end of the intervening portion and a front end of the outer portion; and
the first transmission gear includes a cylindrical portion that extends into a space between the intervening portion and the outer portion from a rear.

3. The outboard motor according to claim 2, wherein the connecting portion is thicker than at least either one of the intervening portion and the outer portion.

4. The outboard motor according to claim 2, wherein the first-transmission-gear bearing is disposed between the cylindrical portion and the intervening portion.

5. The outboard motor according to claim 2, wherein the first-transmission-gear bearing is disposed between the cylindrical portion and the outer portion.

6. The outboard motor according to claim 1, wherein the propeller-shaft bearing and the first-transmission-gear bearing are disposed at positions, respectively, that coincide with each other when viewed from the radial direction.

7. The outboard motor according to claim 1, wherein
the propeller-shaft bearing and the first-transmission-gear bearing are each needle bearings; and
an axis of each needle in the propeller-shaft bearing and an axis of each needle in the first-transmission-gear bearing extend parallel or substantially parallel to each other.

8. The outboard motor according to claim 1, wherein
the lower case includes lubricating oil; and
the support includes a passage for the lubricating oil to pass through the support.

9. The outboard motor according to claim 1, wherein the propeller generates a backward thrust when the clutch body is connected to the first transmission gear to transmit rotation of the first transmission gear to the propeller shaft, and the propeller generates a forward thrust when the clutch body is connected to the second transmission gear to transmit rotation of the second transmission gear to the propeller shaft.

* * * * *